(12) United States Patent
Boudreau

(10) Patent No.: US 7,083,373 B1
(45) Date of Patent: Aug. 1, 2006

(54) WHEELCHAIR STORAGE AND MOVING ASSEMBLY

(76) Inventor: Maryann V. Boudreau, 8500 Belcher Rd. #114, Pinellas Park, FL (US) 33781

( * ) Notice: Subject to any disclaimer, the term of this patent is extended or adjusted under 35 U.S.C. 154(b) by 0 days.

(21) Appl. No.: 10/784,671

(22) Filed: Feb. 24, 2004

(51) Int. Cl.
*B60P 9/00* (2006.01)

(52) U.S. Cl. .................. 414/462; 414/480; 414/537; 414/540

(58) Field of Classification Search .......... 414/537, 414/462, 480, 921; 206/335; 220/4.24, 220/4.22, 756, 771
See application file for complete search history.

(56) References Cited

U.S. PATENT DOCUMENTS

| | | | |
|---|---|---|---|
| 3,878,955 A | | 4/1975 | Udden |
| 4,376,611 A | | 3/1983 | Koop |
| 4,693,289 A | * | 9/1987 | Taylor et al. ............... 150/166 |
| 4,799,609 A | * | 1/1989 | Castilla ....................... 224/513 |
| D306,843 S | | 3/1990 | McConnell |
| 4,936,409 A | * | 6/1990 | Nix et al. .................. 180/68.5 |
| 5,170,826 A | | 12/1992 | Carstensen et al. |
| 5,199,842 A | * | 4/1993 | Watt et al. ................... 414/537 |
| 5,273,335 A | * | 12/1993 | Belnap et al. ................ 296/61 |
| 5,395,020 A | | 3/1995 | King |
| 5,769,593 A | * | 6/1998 | Buffaloe ...................... 414/537 |
| 6,036,012 A | * | 3/2000 | Haseltine et al. ........... 206/335 |
| 6,170,856 B1 | * | 1/2001 | Pena .......................... 280/656 |
| 6,216,867 B1 | * | 4/2001 | Haseltine et al. ........... 206/335 |
| 6,502,730 B1 | * | 1/2003 | Johnson ...................... 224/519 |
| 6,705,624 B1 | * | 3/2004 | Cassoni ................. 280/47.131 |
| 2003/0156930 A1 | * | 8/2003 | Ahedo ........................ 414/462 |
| 2003/0165376 A1 | * | 9/2003 | Bruno et al. ................ 414/462 |

* cited by examiner

*Primary Examiner*—Eileen D. Lillis
*Assistant Examiner*—Gregory W. Adams

(57) ABSTRACT

A wheelchair storage and moving assembly includes a housing having a top wall, a bottom wall, a back wall and a pair of lateral walls. A front side of the housing forms an entry into an interior of the housing. A door has a bottom edge, a top edge and a pair of side edges. A hinge hingedly couples the bottom edge the bottom wall adjacent to the entry such that the door may be positioned in a vertical position covering the entry or angled away from the housing and defining a ramp. A coupler is mounted on the door for selectively coupling the door to the housing in a closed position. A plurality of securing members selectively secures the housing to the vehicle such that one of the lateral walls faces the vehicle.

5 Claims, 4 Drawing Sheets

WHEELCHAIR STORAGE AND MOVING ASSEMBLY

BACKGROUND OF THE INVENTION

1. Field of the Invention

The present invention relates to wheelchair transporting devices and more particularly pertains to a new wheelchair transporting device for storing and transporting a wheelchair by way of a vehicle.

2. Description of the Prior Art

The use of wheelchair transporting devices is known in the prior art. However, these devices are typically cumbersome in their usage or require complicated mounting apparatuses for holding the wheelchair securing assembly. For this reason, there remains a need for a wheelchair holding and transporting device which is easily mountable to a vehicle, in particular cars, and is adapted for the convenient removal and insertion of a wheelchair.

SUMMARY OF THE INVENTION

The present invention meets the needs presented above by generally comprising a housing having a top wall, a bottom wall, a back wall and a pair of lateral walls. A front side of the housing forms an entry into an interior of the housing. A door has a bottom edge, a top edge and a pair of side edges. A hinge hingedly couples the bottom edge to the housing with a hinge for selectively opening and closing the entry. The bottom edge is hingedly coupled to the bottom wall adjacent to the entry such that the door may be positioned in a vertical position covering the entry or angled away from the housing and defining a ramp. A coupler is mounted on the door for selectively coupling the door to the housing in a closed position. A plurality of securing members selectively secures the housing to the vehicle such that one of the lateral walls faces the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
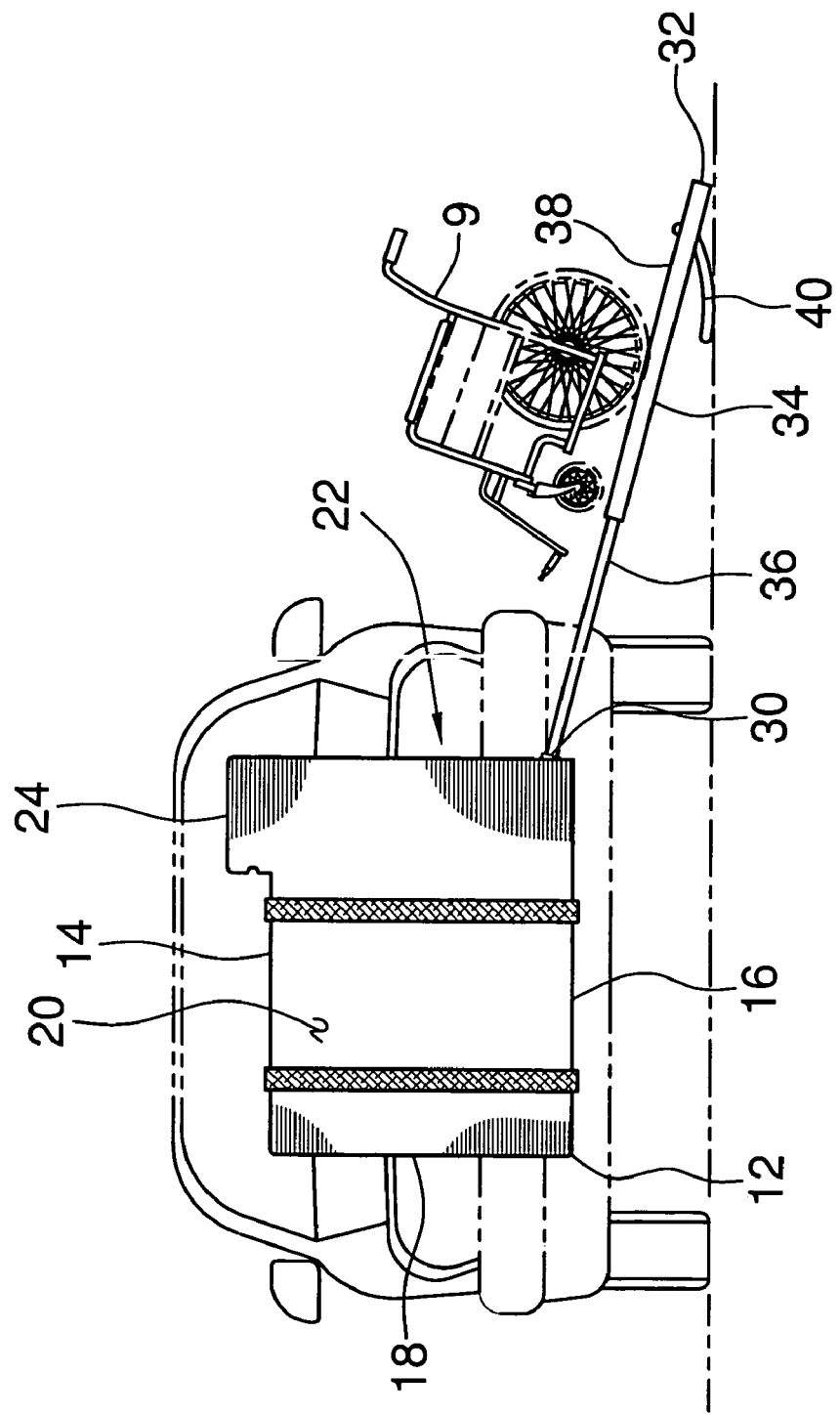
FIG. 1 is a schematic side environmental view of a wheelchair storage and moving assembly according to the present invention.
Figure 2:
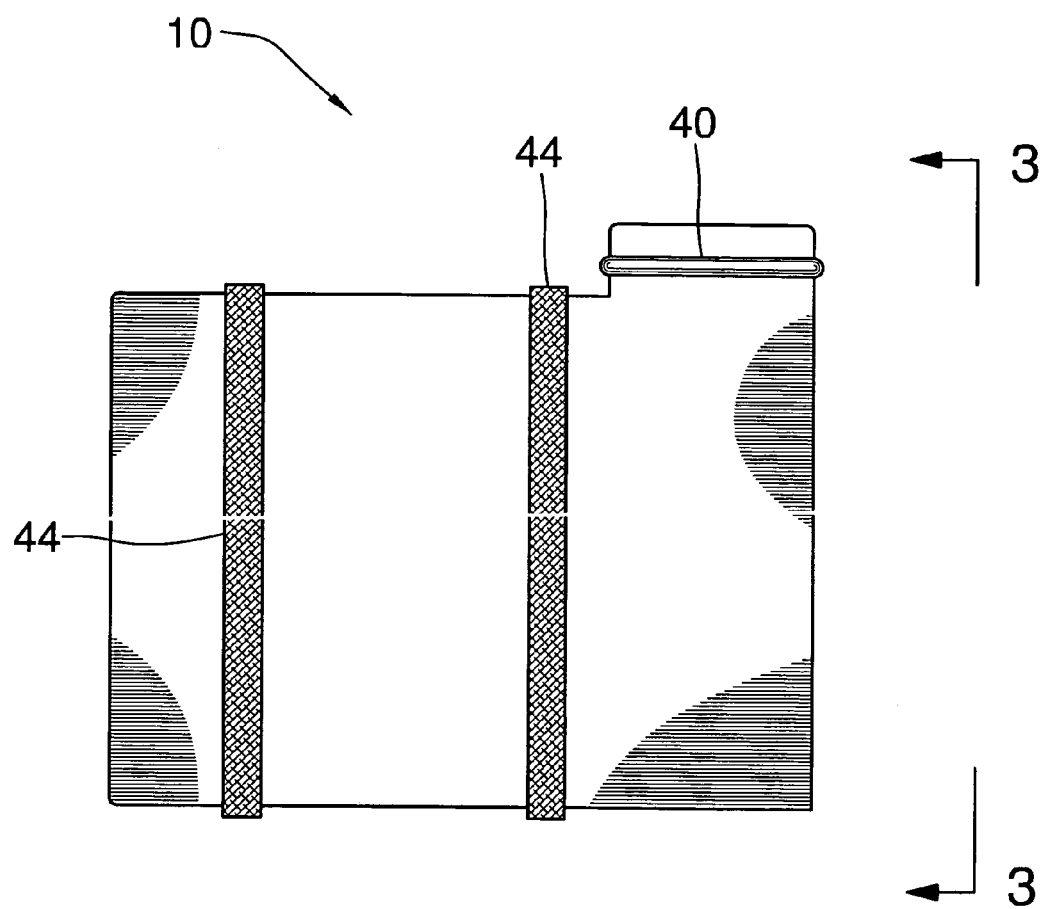
FIG. 2 is a schematic side view of the present invention.
Figure 3:
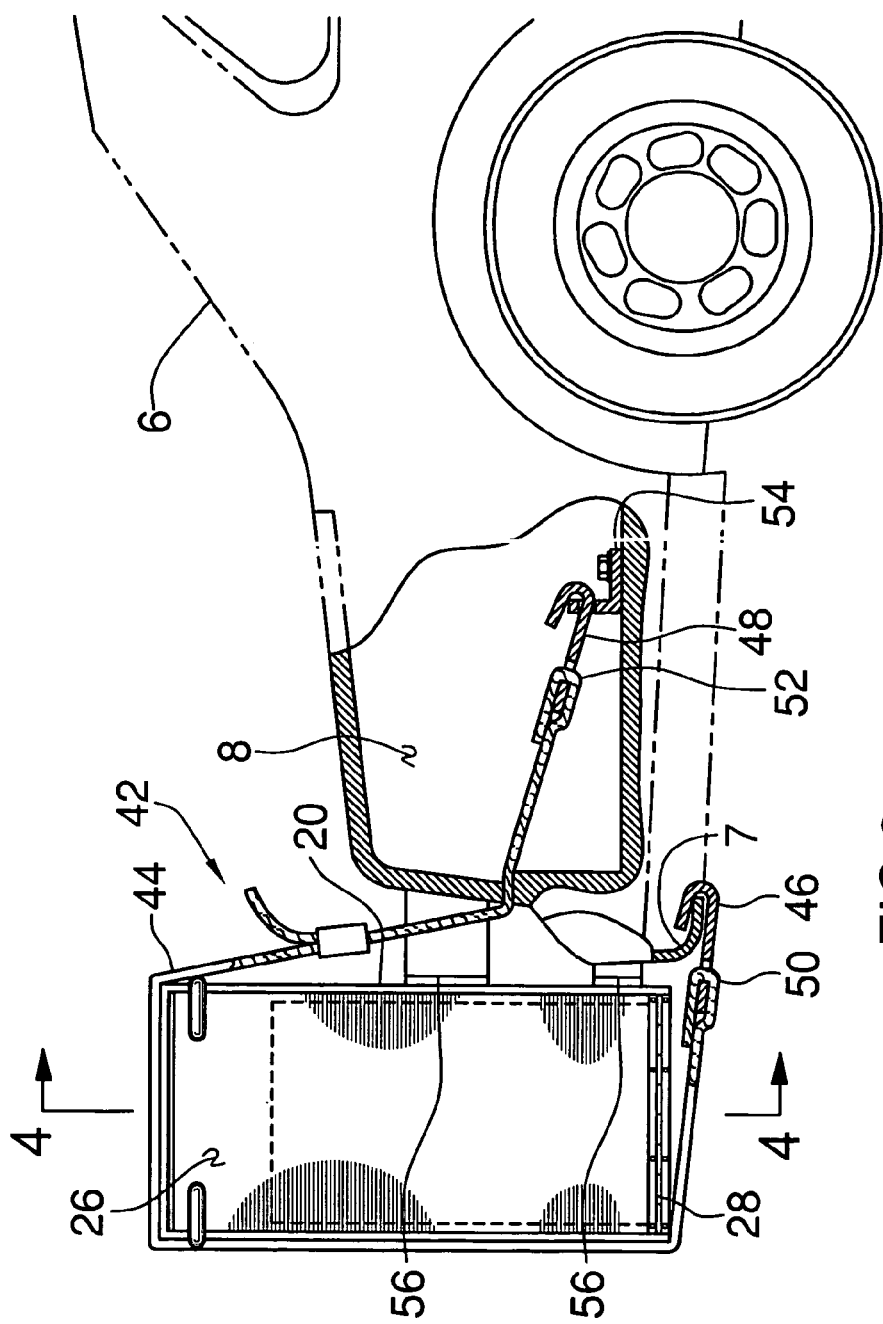
FIG. 3 is a schematic front view of the present invention.
Figure 4:
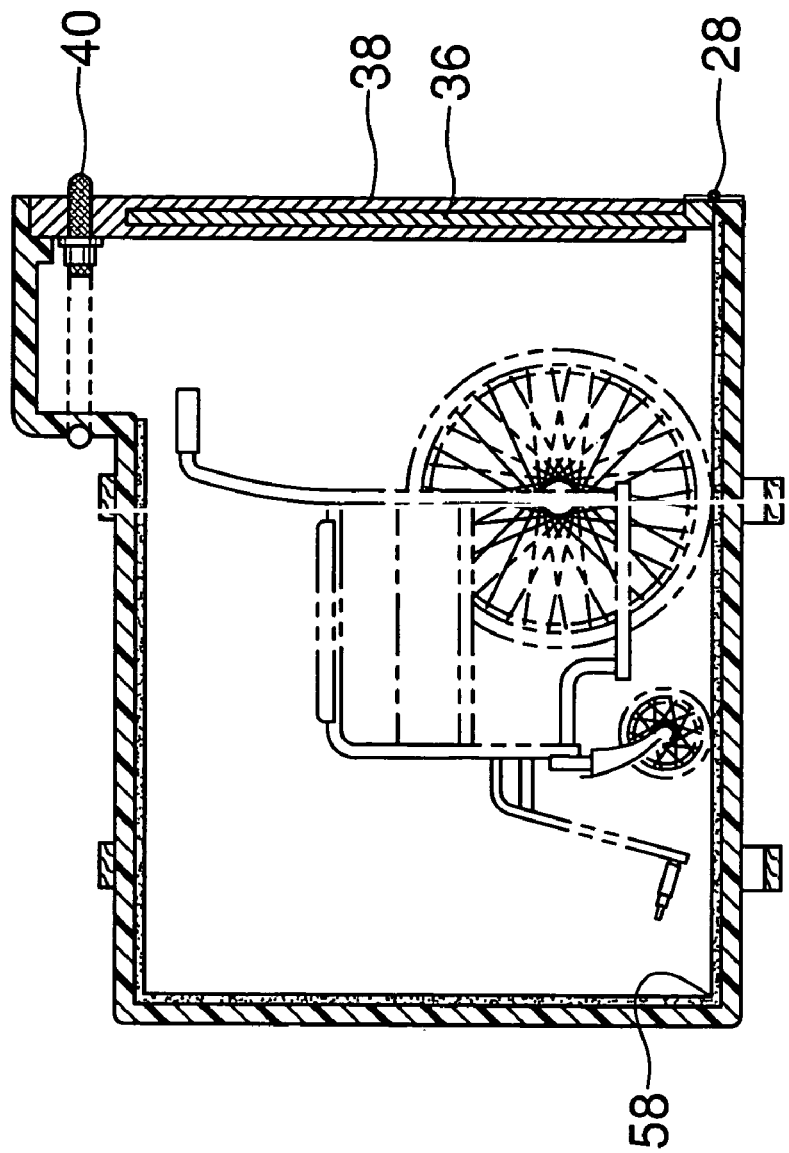
FIG. 4 is a schematic cross-sectional view taken along line 4—4 of FIG. 3 of the present invention.

With reference now to the drawings, and in particular to FIGS. 1 through 4 thereof, a new wheelchair transporting device embodying the principles and concepts of the present invention and generally designated by the reference numeral 10 will be described.

As best illustrated in FIGS. 1 through 4, the wheelchair storage and moving assembly 10 generally comprises a housing 12 having a top wall 14, a bottom wall 16, a back wall 18 and a pair of lateral walls 20. A front side 22 of the housing 12 forms an entry into an interior of the housing 12. The top wall 14 has an elevated portion 24 positioned adjacent to the front side 22.

A door 26 is hingedly coupled to the housing 12 with a hinge 28 for selectively opening and closing the entry. The door 26 has bottom edge 30, a top edge 32 and a pair of side edges 34. The bottom edge 30 is hingedly coupled to the bottom wall 16 with the hinge and positioned adjacent to the entry such that the door 26 may is positioned in a vertical position covering the entry or angled away from the housing 12 and defining a ramp. The door 26 preferably includes a first panel 36 and a second panel 38. The first panel 36 is removably extended into the second panel 38 such that the door 26 may be selectively extended or retracted to alter the length of the door 26 when it functions as a ramp. The first panel 36 is attached to the hinge 28.

A coupler 40 is mounted on the door 26 for selectively coupling the door 26 to the housing 12 in a closed position. The coupler 40 includes a resiliently elastic band that is attached to the door 26 and positioned adjacent to the top edge 32. The band, or coupler 40, is selectively extended around the elevated portion 24 of top wall 14 of the housing 12.

A plurality of securing members 42 selectively secures the housing 12 to a vehicle 6. Each of the securing members 42 includes an elongated strap 44 and a pair of hooks 46, 48. The elongated straps 44 each have a first end 50 and a second end 52. Each of the hooks 46, 48 is attached to one of the first 50 and second 52 ends of each of the straps 44. A first 46 of each of the pair of hooks may be coupled to a bumper 7 of the vehicle 6 and a second 48 of each of the pair of hooks may be coupled to a trunk 8 of the vehicle 6. A bracket 54 may be mounted within the trunk 8 to provide an attachment for the second hooks 48 or the second hooks 48 may be attached to the inner structure of the trunk 8. When the housing 12 is mounted on the vehicle 6, one of the lateral walls 20 faces the vehicle 6 such that access is provided to the door 26.

In use, the housing 12 is used for holding and transporting a wheelchair 9. The door 26 is opened and forms a ramp as shown in FIG. 1 so that a wheelchair 9 may be rolled up the ramp and into the housing 12. The coupler 40 may be utilized as a handle for the lifting of the door 26 into a closed position. Cushioning members 56 may be positioned between the housing 12 and the vehicle 6 to protect the vehicle 6 from the housing 12. The raised portion 24 of the top wall 14 accommodates raised handles of a wheelchair 9. It is preferred that the interior of the housing 12 is lined with a cushioning material 58 to protect the wheelchair 9.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheelchair transportation device for selectively attaching to a vehicle, said device including:
   a housing having a top wall, a bottom wall, a back wall and a pair of lateral walls, a front side of said housing forming an entry into an interior of said housing, said top wall having an elevated portion positioned adjacent to said front side and extending between said lateral walls;
   a door having a top edge, a bottom edge and a pair of side edges, a hinge hingedly coupling said bottom edge to said housing for selectively opening and closing said entry, said bottom edge being hingedly coupled to said bottom wall adjacent to said entry such that said door may being positioned in a vertical position covering said entry or angled away from said housing and wall adjacent to said entry such that said door may being positioned in a defining a camp;
   a coupler being mounted on said door for selectively coupling said door to said housing in a closed position, said coupler including a resiliently elastic band being attached to said door and positioned adjacent to said top edge, said band being selectively extendable around said elevated portion of said housing; and
   a plurality of securing, members for selectively securing said housing to the vehicle such that one of said lateral walls faces the vehicle.

2. The device according to claim 1, wherein said door includes a first panel and a second panel, said first panel being telescopically extended into said second panel such that said door may be selectively extended or retracted, said first panel being attached to said hinge.

3. The device according to claim 2, wherein each of said securing members includes:
   an elongated strap each having a first end and a second end;
   a pair of hooks, each of said hooks being attached to one of said first and second ends; and
   wherein a first of said hooks may be coupled to a bumper of the vehicle and a second of the said hooks coupled to a trunk of the vehicle.

4. The device according to claim 1, wherein each of said securing members includes:
   an elongated strap each having a first end and a second end;
   a pair of hooks, each of said hooks being attached to one of said first and second ends; and
   wherein a first of said hooks may be coupled to a bumper of the vehicle and a second of the said hooks coupled to a trunk of the vehicle.

5. A wheelchair transportation device for selectively attaching to a vehicle, said device including:
   a housing having a top wall, a bottom wall, a back wall and a pair of lateral walls, a front side of said housing forming an entry into an interior of said housing, said top wall having an elevated portion positioned adjacent to said front side;
   a door having a top edge, a bottom edge and a pair of side edges, a hinge hingedly coupling said bottom edge to said housing for selectively opening and closing said entry, said bottom edge being hingedly coupled to said bottom wall adjacent to said entry such that said door may being positioned in a vertical position covering said entry or angled away from said housing and defining a ramp, said dour including a first panel and a second panel, said first panel being telescopically extended into said second panel such that said door may be selectively extended or retracted, said first panel being attached to said hinge;
   a coupler being mounted on said door for selectively coupling said door to said housing in a closed position, said coupler including a resiliently elastic band being attached to said door and positioned adjacent to said top edge, said hand being selectively extended around said elevated portion of said housing;
   a plurality of securing members for selectively securing said housing to the vehicle, each of said securing members including;
   an elongated strap each having a first end and a second end;
   a pair of hooks, each of said hooks being attached to one of said first and second ends; and
   wherein a first of said hooks may be coupled to a bumper of the vehicle and a second of the said hooks coupled to a trunk of the vehicle such that one of said lateral walls is facing the vehicle.

* * * * *